Figure 1:
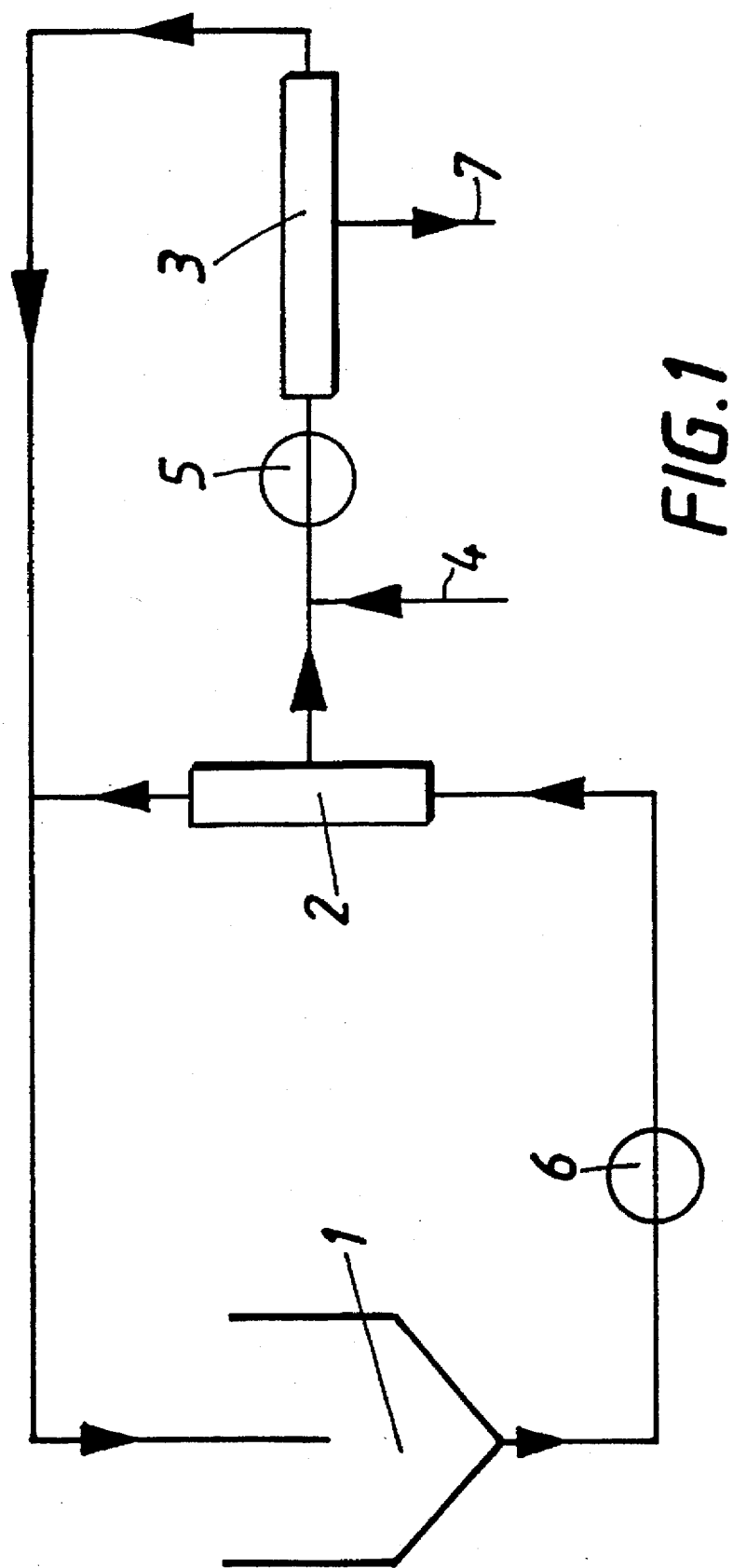

United States Patent [19]
Martin et al.

[11] Patent Number: 5,679,503
[45] Date of Patent: Oct. 21, 1997

[54] METHOD AND DEVICE FOR THE SELECTIVE EXTRACTION OF HALIDE IONS FROM PHOTOGRAPHIC BATHS

[75] Inventors: Didier Jean Martin, Givry; Christian Gilbert Guizard, Montpellier; Jean-Francois Diaz, Assas, all of France

[73] Assignee: Eastman Kodak Company, Rochester, N.Y.

[21] Appl. No.: 691,198

[22] Filed: Aug. 7, 1996

[30] Foreign Application Priority Data

Aug. 11, 1995 [FR] France ............... 95 09897

[51] Int. Cl.⁶ .................................. G03C 5/395
[52] U.S. Cl. .......................... 430/400; 430/398
[58] Field of Search ...................... 430/398, 400

[56] References Cited

U.S. PATENT DOCUMENTS

| | | | |
|---|---|---|---|
| 3,925,175 | 12/1975 | Fisch et al. | 204/109 |
| 4,574,049 | 3/1986 | Pittner | 210/639 |
| 4,995,983 | 2/1991 | Eadie et al. | 210/639 |
| 5,219,717 | 6/1993 | Shmittou | 430/398 |
| 5,234,583 | 8/1993 | Cluff | 210/169 |
| 5,266,203 | 11/1993 | Mukhopadhyay et al. | 210/638 |

FOREIGN PATENT DOCUMENTS

| | | |
|---|---|---|
| 0 348 532 | 12/1994 | European Pat. Off. . |
| 2684024 | 5/1993 | France . |
| 2159810 | 12/1985 | United Kingdom . |

*Primary Examiner*—Hoa Van Le
*Attorney, Agent, or Firm*—John R. Everett

[57] ABSTRACT

The invention concerns a method and a device for extracting the halide ions from fixing or bleaching/fixing photographic solutions containing mainly thiosulfate as the fixing agent, bringing the solutions into contact with a nanofiltration module including at least two membranes of different types.

The method enables the activity of the fixing or bleaching/fixing baths to be extended during the processing of photographic products.

9 Claims, 2 Drawing Sheets

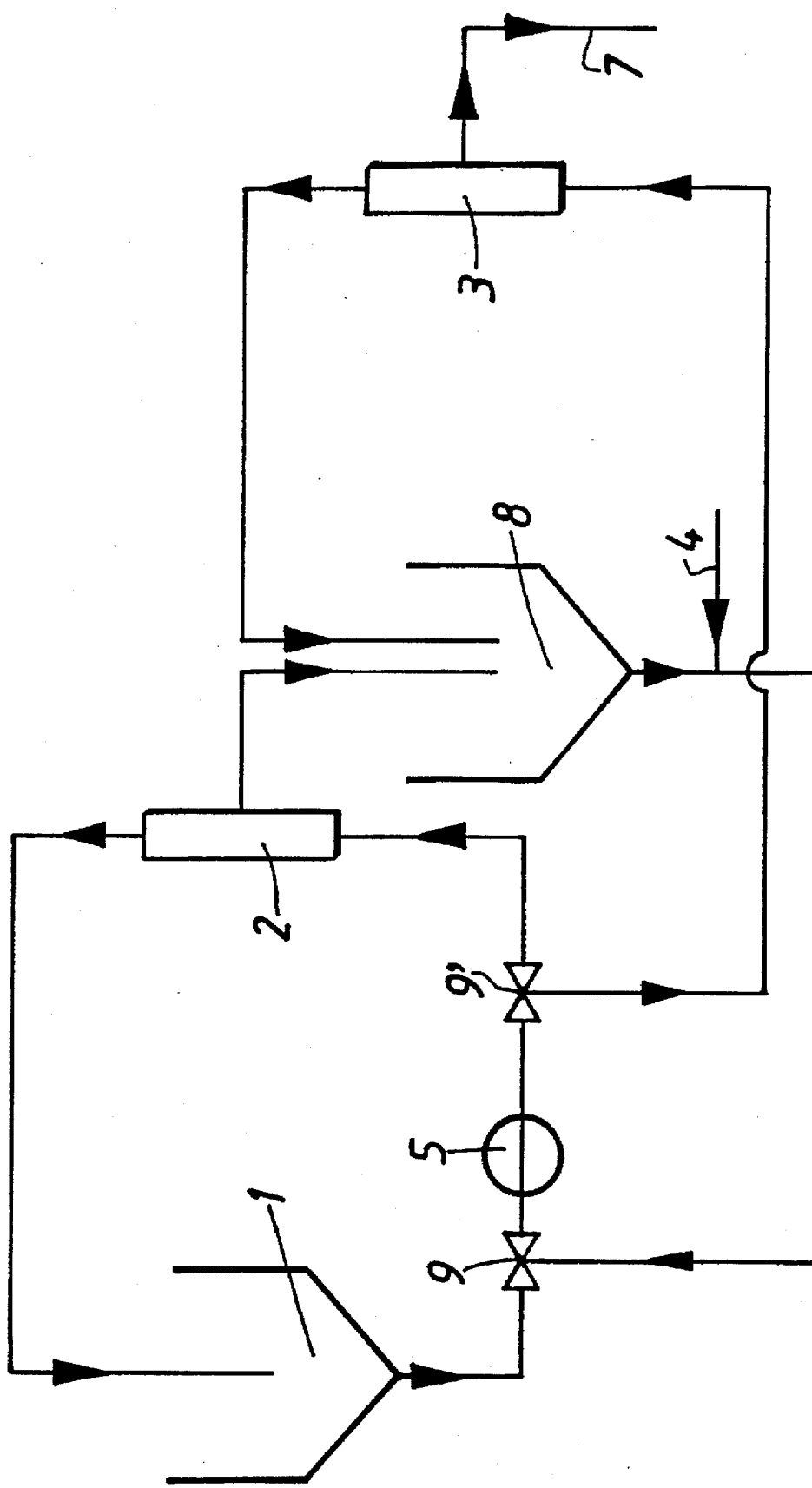

METHOD AND DEVICE FOR THE SELECTIVE EXTRACTION OF HALIDE IONS FROM PHOTOGRAPHIC BATHS

The present invention concerns a method and a device for extracting halide ions from the photographic fixing or bleaching/fixing solutions used in the processing of silver halide photographic products.

More particularly, the invention makes it possible to eliminate the iodide and bromide ions from the aqueous fixing or bleaching/fixing solutions containing principally thiosulfate as a fixing agent by bringing the fixing solution into contact with nanofiltration membranes.

The present invention also concerns a method for the processing of silver halide photographic products comprising a step in which the fixing or bleaching/fixing solution is treated continuously in order to remove, by means of nanofiltration membranes, the major proportion of the halide ions and to maintain an acceptable level of halide ions in the fixing solution throughout the entire processing period.

The basic method for obtaining a silver halide photograph consists of exposing a silver halide photographic product to actinic radiation which produces an image made visible by chemical processing. The fundamental steps in this processing comprise first of all the processing of the product with a developing solution in which some of the silver halide is transformed into metallic silver.

In order to obtain black and white images, it is necessary to eliminate the undeveloped silver halides, and to obtain a colour image it is necessary to eliminate all the silver from the photographic product after the image has been formed. In black and white photography, the elimination of the undeveloped silver halides is obtained by dissolving them in a solvent for silver halides referred to as a fixer and used in a fixing bath. In colour photography, elimination of the silver is obtained by oxidising the metallic silver and by dissolving the oxidised metallic silver and the undeveloped silver halides. Oxidation of the metallic silver is obtained by means of a bleaching agent and the dissolving of the oxidised silver and undeveloped silver halides is obtained by means of a fixing bath. The two operations can be combined by using a bleaching/fixing bath. In the remainder of the description, the term "fixing solution" will designate either fixing baths or bleaching/fixing baths which are seasoned or used, that is to say which have already been used to fix a certain quantity of photographic products.

It is extremely desirable to process photographic products as quickly as possible. In particular, the fixing step must be as short as possible. During the processing, reaction products accumulate in the fixing solutions. These products, mainly dissolved silver and halide ions, retard the fixing reaction and make the fixing solution less efficacious. In order to remedy this, the exhausted solution is reactivated by introducing therein a regeneration solution after a certain quantity of photographic product has been processed. This does not prevent the undesirable substances from accumulating in the processing solution so that finally the activity of the solution can no longer be generated by adding fresh liquid. In practice, when the regeneration solution is introduced into the processing tank, an equivalent quantity of exhausted solution is discharged through an overflow. In order to reduce the concentration of undesirable substances, it is necessary to discharge a very high quantity of exhausted processing solution.

In addition, in order to generate as little pollution as possible, it is necessary to use quantities of chemical products which are as low as possible. One way of reducing the quantities of effluent discharged is to use low regeneration levels in the processing solutions, which makes it possible to reduce the volume of the solution which is discharged through an overflow into the sewer system. If the regeneration levels are reduced, the silver and halide concentrations increase still further and the retarding effect is accentuated. It is therefore possible to use low regeneration levels only by eliminating the undesirable substances from the fixing solutions.

The degree of fixing can be improved and the volume of effluents reduced by eliminating the silver from the used fixing solutions, by chemical or electrochemical means. In practice the silver ion concentration is maintained at between 0.5 g/liter and 1 g/liter. However, these treatments do not eliminate the halide ions and in particular the iodide ions, which have a very high retarding effect. The increase in the bromide ion concentration in the fixing solution does not pose any particular problem since the bromide ions have little effect on the fixing kinetics.

Thus, if the iodide ions could be eliminated from the fixing solutions, a more rapid fixing could be obtained and this would prolong the service life of the fixing solution, whilst using low regeneration rates.

Elimination of the halide ions from the fixing solution is made difficult by the presence of other compounds in this solution, such as thiosulfate, sulphites and silver in chelated form. It is not desirable to eliminate the thiosulfate or sulphite ions, which are the active fixing agents. Unfortunately many methods which could eliminate the iodide ions, such as oxidation, chelation and ion exchange, interfere with these other anions. Sulphite ions and thiosulfate are easily oxidised. Many substances which precipitate or chelate with iodide ions also react with thiosulfate ions. Anion exchange resins extract both iodide ions and thiosulfate ions.

In addition the problem of eliminating iodide ions is made more difficult by the high concentration of compounds which are liable to interfere. Thiosulfate ions are generally present at a concentration of between 0.1 and 2.0 moles/liter. Sulphite ions are present at a concentration of between 0.01 and 1 mole/liter. The iodide ion concentration must be maintained below 0.05 moles/liter and preferably below 0.005 moles/liter. This is why it is essential for the system for eliminating the iodide ions to be extremely selective, in particular with regard to thiosulfate ions.

U.S. Pat. No. 3,925,175 describes the removal of the silver ions and halides by passing the fixing solution through the cathode chamber of an electrodialysis cell. The electrodialysis cell comprises a semi-permeable membrane separating the anode and cathode and further contains a solution of electro-active oxidizable species in the anode compartment. However, such semi-permeable membranes are expensive and are easily blocked by the components in the solution, which makes them ineffective for separation after only a short time. In addition, the process requires electrical equipment and consumes electricity, which increases the cost and complexity of the separation.

European patent application 0 348 532 describes a process in which the fixing solution is brought into contact with an ion exchange resin in order to accelerate the fixing of the photographic product containing silver iodide and reduce the quantity of effluent discharged. However, either these resins eliminate ions other than iodide ions, such as thiosulfate and sulphite ions and chelated silver ions, or cannot be used for eliminating iodide ions from solutions containing many other anionic compounds.

U.S. Pat. No 5,219,717 describes a process for selectively removing iodide ions in fixing and bleaching/fixing baths in which an anionic surfactant is used, a medium absorbing the iodide ions and a polymer, the anionic surfactant having a charge opposite to that of the polymer. For example, the absorbent medium can be silver bromide and the polymer a co-polymer of methacrylate, methacrylamide, acrylate or acrylamide. This highly selective process makes it possible to remove the iodide ions without modifying the thiosulfate concentration. However, the process is difficult to implement since it is necessary to cause to move through the tank containing the fixing solution a polymer support strip covered with the compound absorbing the iodide ions and with the surfactant.

This is why it is desirable to have a method which is simple to implement and which would make it possible to selectively remove the halide ions, in particular the iodide ions, from the fixing solutions from which silver has been removed or the silver ion concentration has already been reduced.

This problem is resolved with the method according to the present invention for selectively extracting the halide ions from aqueous fixing or bleaching/fixing photographic solutions containing thiosulfate ions and halide ions from amongst the substances in solution, a method in which the solution passes through at least one nanofiltration module including at least a first and a second membrane which effect a separation of the substances in solution whilst each forming a permeate and a residue, in which a) the fixing or bleaching/fixing solution passes first of all through a first membrane adapted for the separation of the halide ions with a high flow rate and a high concentration of substances in solution, b) the permeate from the first membrane passes through a second membrane adapted for the separation of the halide ions at a flow rate which is reduced compared with the first membrane and at a lower concentration of the substances in solution, and c) before passing through the second membrane, the permeate from the first membrane is diluted with a volume of water between 0.1 and 10 times the volume of the permeate from the second membrane.

According to the present invention, a device is also produced for selectively extracting the halide ions from aqueous fixing or bleaching/fixing photographic solutions containing thiosulfate ions and halide ions from amongst the substances in solution, a device comprising at least one nanofiltration module comprising at least:

(a) a first membrane adapted for the separation of the halide ions with a high flow rate and a high concentration of substances in solution, (b) a second membrane adapted for the separation of the halide ions at a flow rate which is reduced compared with the first membrane and at a lower concentration of substances in solution, (c) means for diluting the solution before passing through the second membrane.

According to one embodiment, the device of the present invention is a device for the continuous extraction of halide ions which further comprises means for recycling the residue from the first and second membranes to a tank containing the fixing or bleaching/fixing solution; and means for discharging the permeate from the second membrane.

According to another embodiment, the device of the present invention is a device for the batch extraction of halide ions which comprises further to elements (a), (b) and (c), means for recycling the residue from the first membrane to a tank containing the fixing or bleaching/fixing solution, means for taking the permeate from the first membrane to a storage tank, means for taking to the second membrane the permeate from the first membrane contained in the storage tank, means for recycling the residue from the second membrane to the storage tank, means for discharging the permeate from the second membrane.

The present invention also concerns a method for processing silver halide photographic products comprising a step in which the fixing solution is treated in order to extract, by means of the method for the selective extraction of halide ions described above, the major part of the halide ions, and for thus maintaining the concentration of halide ions in the fixing solution at an acceptable level throughout the entire processing period.

During the following description, reference will be made to the drawing in which:

FIG. 1 shows diagrammatically the device according to the invention used for continuously extracting the halide ions from fixing solutions, FIG. 2 shows diagrammatically the device according to the invention used for the batch extraction of the halide ions from fixing solutions.

Nanofiltration is a technique used for the selective separation of salts and soluble organic compounds in solution; it makes it possible to separate substances having a molecular weight of between 200 and 1000. It is a technique based on the phenomena of diffusion and convection through a porous membrane having have a pore size of around 1 nanometer. The solution which has passed through the membrane is referred to as the filtrate or permeate and the solution which is retained by the membrane is referred to as the concentrate or residue.

The nanofiltration membranes can be inorganic or organic. The organic membranes are membranes based on cellulose acetate, poly(amide/imide), polysulfone, acrylic polymers or fluorinated polymers. The inorganic membranes are membranes based on carbon, ceramics, anodised aluminium, sintered metal or porous glass or else made from woven composite based on carbon fibres.

In order to be used, the membranes must be mounted in supports referred to a modules. According to the invention, tubular or spiral modules are used.

The tubular modules, referred to hereinafter as a "tubular membrane", consist of porous hollow tubes to which the semi-permeable membrane is fixed. The solution flows inside the tube. The tubes can be placed either in series or in parallel.

The spiral modules, referred to hereinafter as a "spiral membrane", comprise a flat membrane coiled around a perforated hollow tube designed to collect the permeate. A plastic grille is placed between the membranes in order to space them apart and create turbulence in the flow of the fluid. In order to be able to exert the required pressure on the liquid to be treated, the membrane rolls are inserted into tubular pressure bodies with a system of joints at the ends.

The membranes can be used in "concentration" mode or in "diafiltration" mode. In concentration mode, the permeate is discharged and the residue is recycled. The solution to be treated is more and more concentrated as the treatment continues. In "diafiltration" mode, the solution to be treated is diluted in order to at least partially compensate for the loss of the permeate. It is possible, for example, to introduce a quantity of water ranging from 0.1 to 10 times the quantity of permeate discharged.

The separation activity of the membrane is characterised by the rate of retention of the ions. The rate of retention of an x ion ($Rr_x$) is calculated from the concentrations of this x ion in the permeate ($[X_p]$) and in the residue ($[X_r]$) according to the formula:

$$Rr_x = 1 - ([X_p]/[X_r]).$$

A positive retention rate indicates that the majority of the x ions are retained in the membrane, a negative retention rate that the majority of the x ions pass through the membrane.

The retention rates and the flow of the permeate generally vary over time.

In the present invention, at least one nanofiltration module is used, comprising at least two membranes of different types. The first membrane effects a first separation of the halide ions by operating on a solution with a high concentration of substances and with a high flow rate. The second, more selective membrane allows a more through separation of these ions by operating at a lower concentration of substances and with a lower flow rate.

According to the invention, the first membrane is used in a conventional manner in "concentration" mode. The second membrane is used in "diafiltration" mode by diluting the permeate from the first membrane before it passes through the second membrane with a volume of water of between 0.1 and 10 times the volume of the permeate from the second membrane. The process is preferably carried out at constant volume, the quantity of water added compensating exactly for the volume of permeate discharged. This quantity of water can be added continuously or else on a single occasion.

A device according to the invention for continuously extracting the halide ions from fixing solutions is depicted in FIG. 1.

The used fixing bath coming from the overflow from the processing machine, after passing into a device for eliminating the silver ions (not depicted), is sent into the tank (1). By means of a pump (6), it is then directed to the first nanofiltration membrane (2). The first membrane (2) is a tubular organic membrane with a surface area of 0.05 m². The residue from the first membrane is sent to the tank containing the fixing bath (1) and the permeate is directed to a second nanofiltration membrane (3) by means of a pump (5). A water inlet (4) enables the permeate from the first membrane to be diluted before it passes through the second membrane (3). The membrane (3) is a spiral organic membrane having a surface area of 2.21 m². The permeate from the second membrane (3) is discharged to the drain (7) and the residue is sent to the tank containing the fixing bath (1).

This design enables an acceptable level of halide ions to be maintained in the fixing solution throughout the entire treatment period, whilst using low regeneration rates.

According to another embodiment depicted in FIG. 2, the halide ions are extracted in batch mode. In this device, a single pump (5) and 3-way valves (9, 9') are used, enabling the flow of liquid to be directed in the desired direction. As before, the used de-silvered fixing bath is stored in a tank (1) and then sent to the first nanofiltration membrane (2) by means of a pump (5) and valves (9, 9'). After passing through the first nanofiltration membrane (2), the residue is recycled into the tank containing the fixing bath (1) as before, and the permeate is sent into a storage tank (8). It is then directed to the second nanofiltration membrane (3) by means of the pump (5) and valves (9, 9'). A water inlet (4) enables the permeate from the first membrane to be diluted before passing through the second membrane (3). It is clear that the quantity of water added for the dilution can be calculated by a computer, not shown, the water feed being controlled by this computer. The permeate from the second membrane (3) is discharged to the drain (7) and the residue is sent to the tank (8). At the end of the treatment, the contents of the tanks (1) and (8) are mixed with a view to being reused.

This embodiment is particularly advantageous since it makes it possible to treat, in a single operation, stored used fixing solutions which have undergone treatment for eliminating or reducing silver ions. It is very simple to implement and inexpensive since a single pump is required for the installation to operate.

The invention is described in detail in the following examples.

EXAMPLES

In all the examples, the used fixing solution has the following composition:

| | |
|---|---|
| ammonium thiosulfate | 0.36 moles/l |
| sodium sulphite | 1.03 moles/l |
| ammonium metabisulphite | 0.06 moles/l |
| bromide* | 0.12 moles/l |
| iodide* | 0.0063 moles/l |
| silver nitrate | 0.0093 moles/l |
| acetic acid | 0.038 moles/l |
| soda for adjusting the pH to | 6.8 |

*the bromide and iodide come from the treated emulsions and are associated with alkali metal ions A nanofiltration module is used, comprising an MPT 31 tubular organic membrane sold by KYRIAT WEIZMAINN Ltd (membrane T) and an NF 45 spiral organic membrane sold by FILMTEC CORPORATION (membrane S), the characteristics of which are given in Table 1:

TABLE 1

| | Membrane T | Membrane S |
|---|---|---|
| CARACTÉRISTICS | | |
| Membrane Surface area (m²) | 0,05 | 2,21 |
| Maximum pressure (10² kPa) | 40 | 41 |
| Retention rate % | | |
| MgSO₄ 2 g/l (896 kPa) | — | 98 |
| Glucose 5% (3034 kPa) | 65 | — |
| Glucose 10% (1034 kPa) | — | 91 |
| NaCl 2 g/l (896 kPa) | — | 20 |
| NaCl 0,2% (3034 kPa) | 30 | — |
| CONDITIONS D'UTILISATION | | |
| Temperature (°C.) | 25 | 25 |
| pH | 7 | 7 |
| Flow rate (l/h) | 16,5 | 75 |

Example 1 (comparative)

In this example the tubular nanofiltration membrane is used alone in concentration mode, that is to say with discharge of the permeate, and at a pressure of 3000 kPa.

The results are given in Table 2, where:

Jp represents the flow of the permeate in liters per hour and per m² of membrane surface area, F.C.V. represents the concentration factor expressed as the ratio of the initial volume to the final volume, Rr the retention rate is calculated as explained before.

TABLE 2

| Time (min) | Jp (l/h.m²) | F.C.V. | I⁻ | Ag⁺ | Br⁻ | SO₃⁻ + SO₄⁻ | S₂O₃⁻ |
|---|---|---|---|---|---|---|---|
| | | | \multicolumn{5}{c|}{Retention rate Rr} | |

| Time (min) | Jp (l/h.m²) | F.C.V. | I⁻ | Ag⁺ | Br⁻ | SO₃⁻ + SO₄⁻ | S₂O₃⁻ |
|---|---|---|---|---|---|---|---|
| 60 | 40.2 | 1.1 | −28.6 | 70.2 | −11.5 | 17.3 | 21.3 |
| 120 | 34.8 | 1.3 | −25.0 | 74.5 | −18.7 | 26.1 | 21.3 |
| 180 | 32.4 | 1.4 | −33.3 | 74.8 | −22.6 | 24.4 | 21.4 |
| 240 | 32.4 | 1.6 | −27.5 | 74.1 | −30.2 | 24.6 | 19.8 |
| 300 | 33.0 | 1.8 | −32.8 | 74.8 | −28.7 | 23.2 | 17.3 |
| 360 | 28.8 | 2.1 | −33.8 | 76.0 | −48.6 | 26.0 | 19.5 |
| 420 | 26.4 | 2.5 | −30.0 | 78.0 | −25.3 | 23.2 | 20.9 |
| 490 | 24.6 | 3.0 | −28.0 | 76.8 | −16.3 | 23.9 | 17.7 |

A positive retention rate is observed for the multivalent ions (sulphate, sulphite, thiosulfate) and negative for the monovalent ions. The membrane is not very selective with regard to the halide and thiosulfate ions. The retention rate does not vary significantly over time whilst the flow Jp decreases significantly from 40 to 25 l/h.m² at the end of the concentration stage.

Example 2 (comparative)

In this example the tubular nanofiltration membrane is used alone in diafiltration mode, that is to say with compensation for the loss of volume of the permeate with an equivalent volume of water. The initial volume ($V_{init}$) is 10 liters of fixing agent, and at the end of the experiment, which lasts for 322 minutes, the total volume of water added is 15 liters. The dilution factor (Fd) of the fixing solution is calculated by the formula:

$$Fd = (V_{init} + V_{water})/V_{init}$$

The results are given in Table 3, where $V_{per}$ represents the volume of permeate in liters:

TABLE 3

| Time (min) | Jp (l/h.m²) | Vper | Fd | I⁻ | Ag⁺ | Br⁻ | SO₃⁻ + SO₄ | S₂O₃⁻ |
|---|---|---|---|---|---|---|---|---|
| 60 | 48.0 | 2.6 | 1.26 | −23.2 | 57.0 | −24. | 2 25.9 | 22.1 |
| 120 | 49.2 | 5.0 | 1.50 | −27.9 | 60.0 | −16. | 6 33.9 | 26.9 |
| 180 | 55.2 | 7.8 | 1.78 | −31.0 | 61.2 | −24. | 2 38.2 | 29.2 |
| 240 | 58.8 | 10.8 | 2.08 | −41.5 | 64.5 | −41. | 2 42.4 | 33.7 |
| 300 | 64.8 | 13.8 | 2.38 | −35.7 | 68.9 | −22. | 5 48.4 | 48.1 |
| 322 | 67.2 | 15.0 | 2.50 | −43.5 | 66.7 | −19. | 1 46.9 | 48.1 |

The separation is improved with regard to the selectivity compared with Example 1 since the thiosulfate retention level is increased whilst the halide ion retention level decreases. The initial concentration of halide ions is divided by a factor of 2 for a period of 120 minutes and divided by 4 for 240 minutes.

Starting from these data, it is possible to calculate the initial concentration ($R_{init}$) and the concentration of a given compound in the residue at a given time ($R_{120}$ and $R_{240}$) and the loss of compound as a % at 120 and 240 minutes. Table 4 gives the results:

TABLE 4

| Compounds | $R_{init}$ | $R_{120}$ | Loss₁₂₀ % | $R_{240}$ | Loss₂₄₀ % |
|---|---|---|---|---|---|
| Ag+ | 0.48 | 0.40 | 17 | 0.31 | 35 |
| SO₃⁻ + SO₄⁻ | 29.40 | 19.55 | 33 | 14.97 | 49 |
| S₂O₃⁻ | 124.40 | 85.72 | 31 | 56.99 | 54 |

For 120 minutes, the initial halide concentration in the fixer is divided by 2, but the thiosulfate loss of 31% is too high. These results show that the tubular membrane used in diafiltration mode does not afford a satisfactory retention of the thiosulfate, sulphite and silver ions.

Example 3 (comparative)

In this example, the spiral membrane is used in concentration mode. To avoid clogging of the membrane, a filter is placed before this membrane, eliminating the particles in the fixing solution. The operation is carried out at a pressure of 35×10² kPa. The results are set out in Table 5.

TABLE 5

| Time (min) | Jp (l/h.m²) | I⁻ | Ag⁺ | Br⁻ | SO₃⁻ + SO₄ | S₂O₃⁻ |
|---|---|---|---|---|---|---|
| 45 | 1.8 | −92.2 | 71.4 | −68.0 | 9.8 | 68.1 |
| 90 | 1.6 | −74.6 | 91.8 | −59.3 | 9.3 | 65.6 |

It can be seen that the spiral membrane is more selective than the tubular membrane with regard to the separation of the halide ions and thiosulfate ions. However, a much greater reduction in the flow of permeate is observed that with the tubular membrane. The flow rate is very low.

Example 4 (comparative)

In this example the spiral nanofiltration membrane is used alone in diafiltration mode, that is to say with compensation for the loss of volume of the permeate with an equivalent volume of water. The initial volume ($V_{init}$) is 10 liters of fixing agent, and at the end of the experiment, which lasts for 180 minutes, the total volume of water added is 28 liters. The results are given in Table 6:

TABLE 6

| Time (min) | Jp (l/h.m²) | Vper | Fd | I⁻ | Ag⁺ | Br⁻ | SO₃⁻ + SO₄ | S₂O₃⁻ |
|---|---|---|---|---|---|---|---|---|
| 30 | 2.8 | 2.8 | 1.28 | −121.1 | 95.2 | −114. | 0 25.9 | 75.3 |
| 60 | 3.5 | 6.3 | 1.63 | −164.7 | 95.3 | −108. | 1 37.5 | 78.7 |
| 90 | 4.2 | 10.5 | 2.05 | −216.7 | 97.6 | −193. | 3 38.1 | 80.6 |
| 120 | 5.1 | 15.8 | 2.58 | **** | 97.7 | −311. | 1 71.8 | 83.9 |
| 150 | 5.4 | 21.5 | 3.21 | **** | 97.7 | −150. | 0 89.6 | 85.6 |
| 182 | 7.1 | 28.0 | 3.80 | **** | 97.7 | **** | 95.1 | 89.4 |

**** the residur no longer contains any halide ions

The performance of the spiral membrane is appreciably improved in diafiltration mode. The flow increases from 2.8 to 7.1 l/h.m². The retention level for thiosulfate, silver and sulphites+sulphate is improved. The selectivity increases when the concentration of substances decreases. After 120 minutes, the halide ions are completely eliminated from the fixing solution. However, the flow rate still remains very low.

Example 5 (invention)

In this example, the tubular membrane and spiral membrane are used in association. The tubular membrane is used in concentration mode and the spiral membrane in diafiltration mode, the quantity of water being added on a single occasion at the outset.

In this example, 20 liters of fixing agent are treated over 365 minutes with the tubular membrane at a pressure of $30 \times 10^2$ kPa. The concentration factor is 3. 13.3 liters of permeate are obtained.

13.3 liters of water is added to 6.66 liters of this permeate and the diluted permeate is sent through the second spiral membrane. The operation is carried out at a pressure of $35 \times 12^2$ kPa. The operation is stopped when the volume of permeate in the second membrane is equal to the volume of water introduced, that is to say 13.3 liters. The dilution factor is 2.

The results are set out in Table 7.

TABLE 7

| Membrane | Time (min) | Jp (l/h.m²) | Vper | I⁻ | Ag⁺ | Br⁻ | SO₃⁻ + SO₄⁻ | S₂O₃⁻ |
|---|---|---|---|---|---|---|---|---|
| TM | 365 | 30.0 | 13.3 | −25.4 | 66.7 | −28.5 | 25.8 | 15.0 |
| SM | 5 | — | 5.0 | −171.0 | 97.3 | −151. | 8 49.3 | 95.3 |
| SM | 10 | 8.2 | 7.3 | −167.7 | 97.6 | −161. | 3 56.8 | 92.2 |
| SM | 20 | 7.7 | 10.0 | −166.7 | 96.4 | −185. | 6 28.5 | 90.1 |
| SM | 30 | 5.0 | 12.4 | −163.2 | 95.5 | −141. | 2 24.7 | 85.8 |
| SM | 35 | 4.3 | 13.3 | −158.8 | 94.7 | −158. | 8 24.5 | 83.2 |

The efficiency of the separation is calculated by adding the residues from the two membranes and taking account of the concentration factor for the tubular membrane and of the dilution for the spiral membrane.

The loss of concentration for the different constituents of the fixing bath is as follows:

| | |
|---|---|
| silver | 3.7% |
| thiosulfate | 10% |
| sulphite + sulphate | 23% |
| iodide | 68.2% |
| bromide | 57.5% |

This example shows that it is possible to recycle the fixing bath by using nanofiltration membranes with two separation steps: a first step with a tubular organic membrane operating in concentration mode and a second step with a spiral organic membrane operating in diafiltration mode.

Regeneration is obtained with a good level of efficiency. An equivalent volume of fixing agent is recovered with a low loss of thiosulfate (10%), having eliminated around 70% of the iodide ions and around 60% of the bromide ions.

The invention has been described in detail with particular reference to certain preferred embodiments thereof, but it will be understood that variations and modifications can be effected within the spirit and scope of the invention.

What is claimed is:

1. Method for selectively extracting the halide ions from aqueous fixing or bleaching/fixing photographic solutions containing thiosulfate ions and halide ions from amongst the substances in solution, a method in which the solution passes through at least one nanofiltration module including at least a first and a second membrane which effect a separation of the substances in solution whilst each forming a permeate and a residue, characterised in that a) the fixing or bleaching/fixing solution passes first of all through a first membrane adapted for the separation of the halide ions with a high flow rate and a high concentration of substances in solution, b) the permeate from the first membrane passes through a second membrane adapted for the separation of the halide ions at a flow rate which is reduced compared with the first membrane and at a lower concentration of the substances in solution, and c) before passing through the second membrane, the permeate from the first membrane is diluted with a volume of water between 0.1 and 10 times the volume of the permeate from the second membrane.

2. Method according to claim 1, in which the residues from the first and second membranes are continuously recycled to the fixing or bleaching/fixing solution and the permeate from the second membrane is discharged.

3. Method according to claim 1, in which the residue from the first membrane is recycled to the fixing or bleaching/fixing solution, the permeate from the first membrane is taken to a storage tank and is diluted before passing through the second membrane, the residue from the second membrane is recycled to the fixing or bleaching/fixing solution, and the residue from the second membrane is discharged.

4. Method according to claim 1, in which, before passing through the second membrane, the permeate from the first membrane is diluted with a volume of water which is substantially equal to the volume of the permeate from the second membrane.

5. Method according to claim 1, in which the first membrane has a thiosulfate retention rate higher than 15 and a halide retention rate lower than −20, when it is used in concentration mode for a permeate flow of 30 l/h/m².

6. Method according to claim 1, in which the second membrane has a thiosulfate retention rate higher than 60 and a halide retention rate lower than −60, when it is used in concentration mode for a permeate flow of 1.8 l/h/m².

7. Method according to claim 1, in which the first membrane is a tubular organic nanofiltration membrane.

8. Method according to claim 1, in which the second membrane is a spiral organic nanofiltration membrane.

9. Method for treating silver halide photographic products, comprising a step in which the fixing solution is treated in order to extract the major part of the halide ions and thus to maintain the concentration of halide ions in the fixing solution at an acceptable level throughout the entire treatment period, a method in which the fixing or bleaching/fixing solution passes through at least one nanofiltration module including at least a first and a second membrane which each effect a separation of the substances in solution, forming a permeate and residue:

a) the solution passes first of all through a first membrane adapted for the separation of the halide ions with a high flow rate and a high concentration of the substances in solution, b) the permeate from the first membrane passes through a second membrane adapted for the separation of the halide ions at a reduced flow rate compared with the first membrane and at a lower concentration of the substances in solution, and c) before passing through the second membrane, the permeate from the first membrane is diluted with a volume of water between 0.1 and 10 times the volume of the permeate from the second membrane.

* * * * *